United States Patent
Nakano et al.

(10) Patent No.: US 12,335,840 B2
(45) Date of Patent: Jun. 17, 2025

(54) WIRELESS COMMUNICATION DEVICE, ROADSIDE UNIT, AND WIRELESS COMMUNICATION METHOD

(71) Applicant: Panasonic Intellectual Property Management Co., Ltd., Osaka (JP)

(72) Inventors: Kosei Nakano, Kanagawa (JP); Hiroyuki Motozuka, Kanagawa (JP); Masataka Irie, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 696 days.

(21) Appl. No.: 17/448,697

(22) Filed: Sep. 23, 2021

(65) Prior Publication Data

US 2022/0015004 A1    Jan. 13, 2022

Related U.S. Application Data

(63) Continuation of application No. PCT/JP2020/006314, filed on Feb. 18, 2020.

(30) Foreign Application Priority Data

Mar. 27, 2019    (JP) .................................. 2019-061481

(51) Int. Cl.
*H04W 40/22*    (2009.01)
*H04B 7/024*    (2017.01)
(Continued)

(52) U.S. Cl.
CPC ............ *H04W 40/22* (2013.01); *H04B 7/024* (2013.01); *H04B 7/0608* (2013.01); *H04W 4/46* (2018.02)

(58) Field of Classification Search
None
See application file for complete search history.

(56) References Cited

U.S. PATENT DOCUMENTS 10,051,548 B1 *  8/2018  Reeves ............... H04B 7/15528
2005/0032535 A1 *  2/2005  Shitama ................ H04W 48/16
                                                                455/512
(Continued)

FOREIGN PATENT DOCUMENTS

JP    2003/132492 A    5/2003
JP    2005/038202 A    2/2005
(Continued)

OTHER PUBLICATIONS

International Search Report, mailed May 19, 2020, for International Application No. PCT/JP2020/006314, 4 pages. (with English translation).

(Continued)

*Primary Examiner* — Nicholas Sloms
(74) *Attorney, Agent, or Firm* — Seed IP Law Group LLP

(57) ABSTRACT

The present invention improves the success rate of wireless connection in communications between moving objects or roadside unit-to-moving object communications. A wireless communication device (100) includes a first radio (101) and a second radio (102). The first radio (101) scans, at one of the front and rear of a moving object (10), a first connection destination detecting signal for first moving object-to-moving object communication or first roadside unit-to-moving object communication. The second radio (102) transmits, toward the other of the front and rear of the moving object (10), a second connection destination detecting signal for second moving object-to-moving object communication or second roadside unit-to-moving object communication.

16 Claims, 14 Drawing Sheets

(51) Int. Cl.
*H04B 7/06* (2006.01)
*H04W 4/46* (2018.01)

(56) References Cited

U.S. PATENT DOCUMENTS

| | | | |
|---|---|---|---|
| 2011/0034201 A1 | 2/2011 | Hamada et al. | |
| 2015/0350859 A1* | 12/2015 | Hiben | H04W 40/22 |
| | | | 455/404.1 |
| 2016/0135115 A1* | 5/2016 | Patil | H04W 4/80 |
| | | | 370/338 |
| 2017/0012657 A1* | 1/2017 | Stählin | G08G 1/161 |
| 2017/0188296 A1 | 6/2017 | Fujikami et al. | |
| 2017/0289896 A1* | 10/2017 | Onishi | H04L 67/12 |
| 2018/0139681 A1* | 5/2018 | Jung | H04W 56/0015 |
| 2018/0198539 A1* | 7/2018 | Kim | H04B 17/336 |
| 2018/0234904 A1* | 8/2018 | Lee | H04W 36/32 |
| 2018/0332563 A1* | 11/2018 | Sihlbom | H04W 48/10 |
| 2019/0351896 A1* | 11/2019 | Solmaz | G08G 1/0962 |
| 2020/0019445 A1* | 1/2020 | Altintas | G06F 9/5038 |
| 2020/0074674 A1* | 3/2020 | Guo | G06V 20/54 |
| 2020/0100120 A1* | 3/2020 | Oyabu | G08G 1/0112 |
| 2020/0273197 A1* | 8/2020 | Zhao | E01F 9/30 |
| 2021/0167929 A1* | 6/2021 | Osawa | H04W 92/18 |
| 2021/0209949 A1* | 7/2021 | Hisanaga | G08G 1/16 |
| 2022/0039080 A1* | 2/2022 | Khoryaev | H04W 4/40 |
| 2022/0110134 A1* | 4/2022 | Wang | H04W 28/0289 |
| 2022/0198429 A1* | 6/2022 | Yang | G06Q 20/14 |

FOREIGN PATENT DOCUMENTS

| | | |
|---|---|---|
| JP | 2005/234921 A | 9/2005 |
| JP | 2008/288820 A | 11/2008 |
| JP | 2010/011143 A | 1/2010 |
| WO | 2009/133740 A1 | 11/2009 |
| WO | 2016/009481 A1 | 1/2016 |

OTHER PUBLICATIONS

LAN/MAN Standards Committee of the IEEE Computer Society, "IEEE Standard for Information technology- Telecommunications and information exchange between systems, Local and metropolitan area networks- Specific requirements, Part 11: Wireless LAN Medium Access Control (MAC) and Physical Layer (PHY) Specifications," IEEE Std 802.11™-2016, Nov. 2012, 3534 pages.

* cited by examiner

WIRELESS COMMUNICATION DEVICE, ROADSIDE UNIT, AND WIRELESS COMMUNICATION METHOD

TECHNICAL FIELD

The present disclosure relates to a radio communication apparatus, a roadside apparatus, and a radio communication method.

BACKGROUND ART

Patent Literature 1 discloses a method of performing communication (roadside-to-vehicle communication) between a base station (access point (AP)) and a terminal (station (STA)) by providing antennas that have directivity on the front side and the rear side of a train (vehicle).

Meanwhile, Non Patent Literature 1 specifies a Personal Basic Service Set (PBSS) as a method for communication between terminals with no base station involved. In the PBSS, a PBSS Central Point (PCP) that determines scheduling is determined from among a plurality of communicable STAs in the vicinity.

CITATION LIST

Patent Literature

PTL1
Japanese Patent Application Laid-Open No. 2008-288820

Non Patent Literature

NPL 1
IEEE 802.11-2016

SUMMARY OF INVENTION

One non-limiting and exemplary embodiment facilitates providing an improved radio communication apparatus, roadside apparatus, and radio communication method for increasing a success rate of radio connection in moving object-to-moving object communication or roadside apparatus-to-moving object communication.

A radio communication apparatus according to an embodiment of the present disclosure includes: a first radio device, which in operation, scans a first signal for detecting a connection destination on one of a front side or a back side of a moving object, the first signal for detecting the connection destination being a signal for first moving object-to-moving object communication or first roadside apparatus-to-moving object communication; and a second radio device, which in operation, transmits a second signal for detecting a connection destination toward the other of the front side or the back side of the moving object, the second signal for detecting the connection destination being a signal for second moving object-to-moving object communication or second roadside apparatus-to-moving object communication.

A roadside apparatus according to an embodiment of the present disclosure includes: a first radio device, which in operation, scans a first signal for detecting a connection destination on one of a side where a moving object approaches the roadside apparatus or a side where the moving object moves away from the roadside apparatus, the first signal for detecting the connection destination being a signal for first roadside apparatus-to-moving object communication; and a second radio device, which in operation, transmits a second signal for detecting a connection destination toward the other of the side where the moving object approaches the roadside apparatus or the side where the moving object moves away from the roadside apparatus, the second signal for detecting the connection destination being a signal for second roadside apparatus-to-moving object communication.

A radio communication method for a moving object according to an embodiment of the present disclosure includes: scanning, by a first radio device of the moving object, a first signal for detecting a connection destination on one of a front side or a back side of the moving object, the first signal for detecting the connection destination being a signal for first moving object-to-moving object communication or first roadside apparatus-to-moving object communication; and transmitting, by a second radio device of the moving object, a second signal for detecting a connection destination toward the other of the front side or the back side of the moving object, the second signal for detecting the connection destination being a signal for second moving object-to-moving object communication or second roadside apparatus-to-moving object communication.

A radio communication method for a roadside apparatus according to an embodiment of the present disclosure includes: scanning, by a first radio device of the roadside apparatus, a first signal for detecting a connection destination on one of a side where a moving object approaches the roadside apparatus or a side where the moving object moves away from the roadside apparatus, the first signal for detecting the connection destination being a signal for first roadside apparatus-to-moving object communication; and transmitting, by a second radio device of the roadside apparatus, a second signal for detecting a connection destination toward the other of the side where the moving object approaches the roadside apparatus or the side where the moving object moves away from the roadside apparatus, the second signal for detecting the connection destination being a signal for second roadside apparatus-to-moving object communication.

It should be noted that general or specific embodiments may be implemented as a system, an apparatus, a method, an integrated circuit, a computer program, a storage medium, or any selective combination thereof.

According to an embodiment of the present disclosure, it is possible to increase a success rate of radio connection in moving object-to-moving object communication or roadside apparatus-to-moving object communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
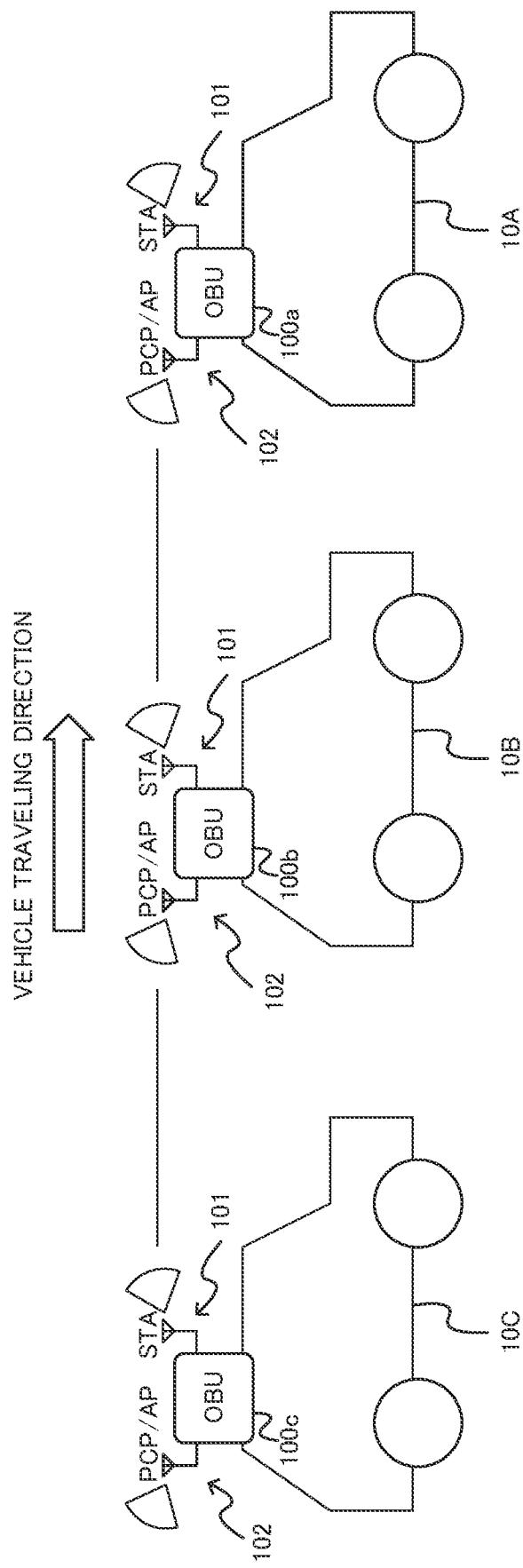
FIG. 1 illustrates an exemplary configuration of a radio communication system.

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for the person skilled in the art to sufficiently understand the present disclosure, and are not intended to limit the subject matter described in the claims.

Common components in the drawings are denoted by the same reference signs. In addition, reference signs such as "vehicle 10A" and "vehicle 10B" are sometimes used for description distinguishing elements of the same type, and a common number of the reference signs such as "vehicle 10" is sometimes used for description without distinguishing elements of the same type. Note that a "vehicle" may be referred to as a "moving object" or "mobility".

It is difficult to quickly and efficiently determine a PCP that optimizes a range where inter-vehicle or roadside-to-vehicle communication is successfully performed in radio communication around intersections or in congested multiple lanes where the surrounding traffic condition changes constantly.

For example, an in-vehicle apparatus located outside the communication range of a determined PCP cannot find the PCP, and is likely to fail to establish inter-vehicle or roadside-to-vehicle communication accordingly.

By way of example, here is a case of inter-vehicle communication of three in-vehicle apparatuses traveling in the same direction. When the leading first in-vehicle apparatus can communicate with the second in-vehicle apparatus to follow, for example, the leading first in-vehicle apparatus is determined to be a PCP. Here, the third in-vehicle apparatus approaches the second in-vehicle apparatus from behind, and attempts the inter-vehicle communication. It is highly likely, however, that the third in-vehicle apparatus fails to join the PBSS to which the first in-vehicle apparatus and the second in-vehicle apparatus belong when the third in-vehicle apparatus is out of a communication range of the first in-vehicle apparatus since the third in-vehicle apparatus cannot find the PCP, which is the first in-vehicle apparatus.

As another example, a base station may be determined to be the PCP. Here is a case where two in-vehicle apparatuses travel toward a single roadside apparatus, for example. When the roadside apparatus and the first in-vehicle apparatus heading toward the roadside apparatus can communicate with each other, the roadside apparatus is determined to be the PCP, by way of example.

Here, the second in-vehicle apparatus approaches the first in-vehicle apparatus from behind, and attempts the inter-vehicle communication. It is highly likely, however, that the second in-vehicle apparatus fails to join the PBSS to which the roadside apparatus and the first in-vehicle apparatus belong when the second in-vehicle apparatus is out of a communication range of the roadside apparatus since the second in-vehicle apparatus cannot find the roadside apparatus that has been determined to be the PCP, as is the case with the inter-vehicle communication of the three in-vehicle apparatuses described above.

As described above, the radio apparatus succeeding in joining the PBSS and the radio apparatus failing to joining the PBSS are determined depending on which in-vehicle apparatus or roadside apparatus is determined to be (or selected as) the PCP. Thus, it is impractical to determine the PCP in a road environment where the surrounding traffic condition changes constantly.

The embodiment described below provides a description of a technique for increasing a success rate of radio connection in inter-vehicle communication (moving object-to-moving object communication) or roadside-to-vehicle communication (roadside apparatus-to-moving object communication). Note that, in the following description, the inter-vehicle communication is sometimes referred to as "vehicle-to-vehicle (V2V) communication", and the roadside-to-vehicle communication is sometimes referred to as "vehicle-to-infrastructure (V2I) communication" or "infrastructure-to-vehicle (I2V) communication".

Embodiment 1

Figure 2:
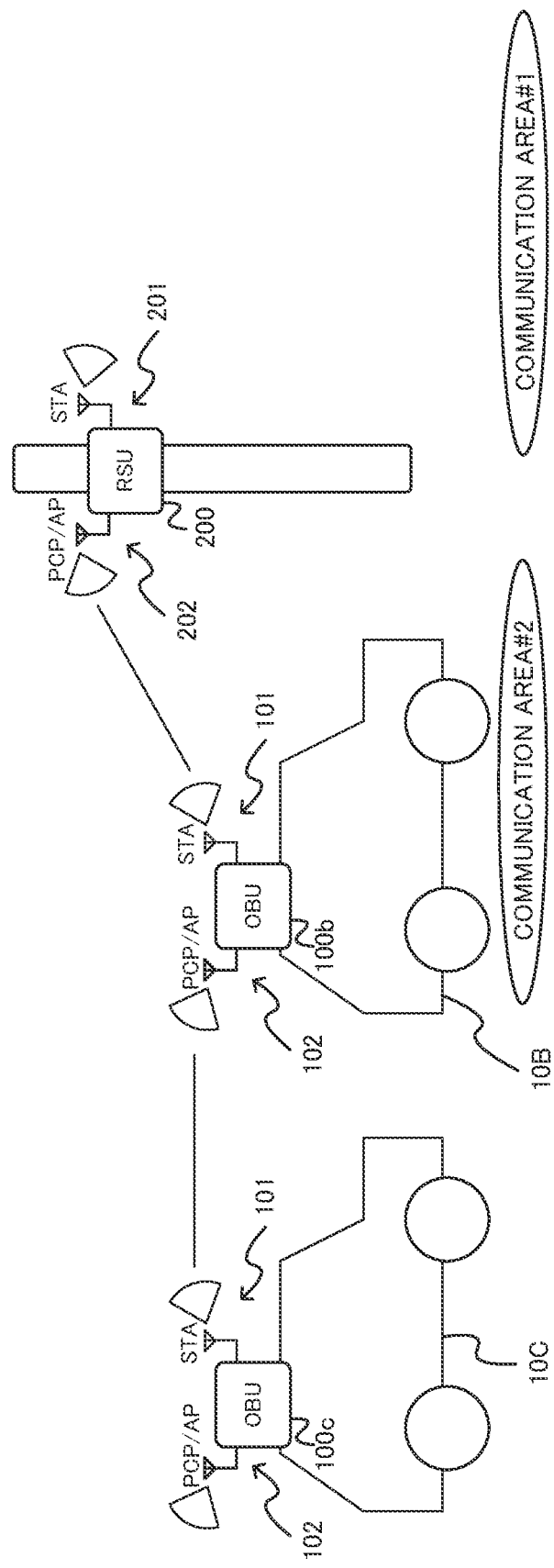
FIG. 2 illustrates an exemplary configuration of another radio communication system.
Figure 3:
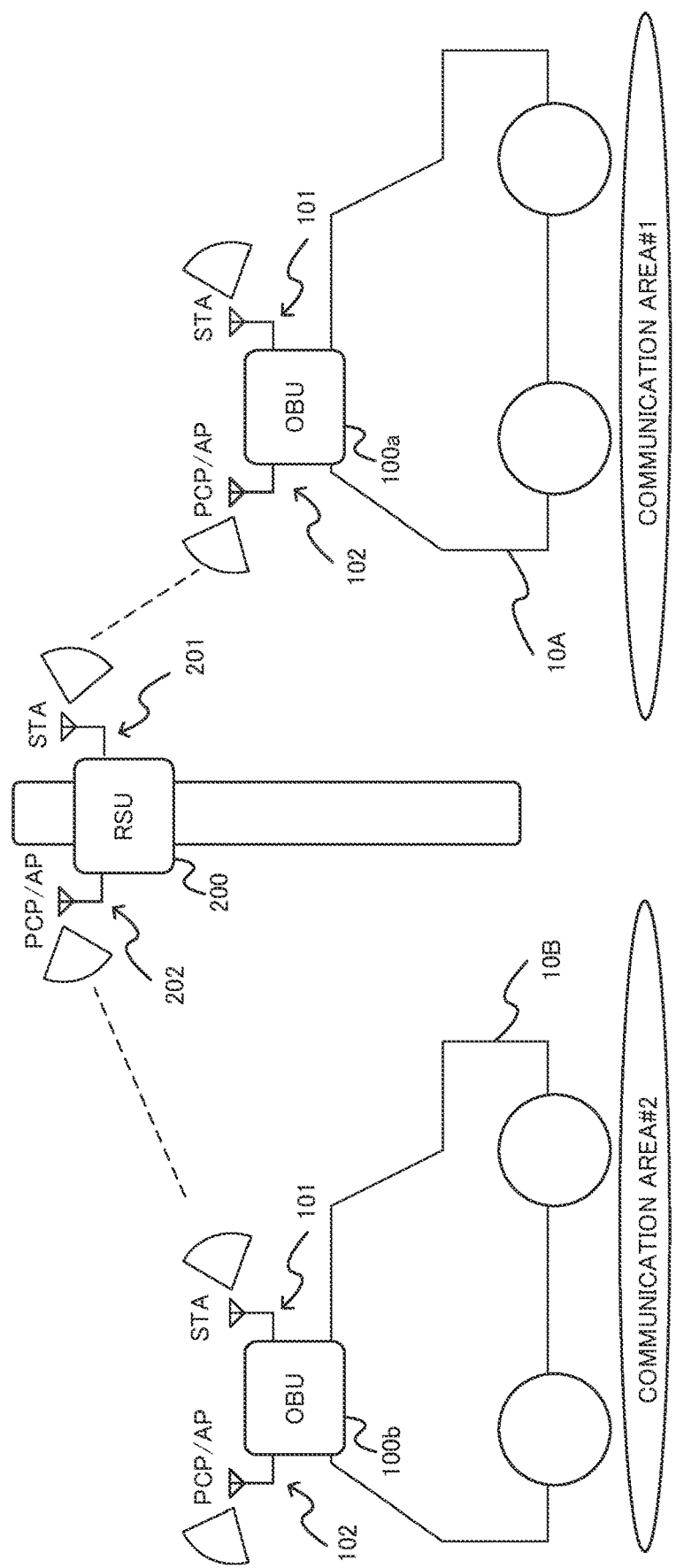
FIG. 3 illustrates an exemplary configuration of still another radio communication system.

FIGS. 1, 2, and 3 each illustrate an exemplary configuration of a radio communication system according to Embodiment 1. FIG. 1 illustrates an exemplary communication mode focusing on inter-vehicle communication, and FIG. 2 illustrates another exemplary communication mode focusing on inter-vehicle communication and roadside-to-vehicle communication. Additionally, FIG. 3 illustrates still another exemplary communication mode focusing on roadside-to-vehicle communication.

Note that the communication modes illustrated in FIGS. 1, 2, and 3 may be regarded as communication modes in the same radio communication system, or may be regarded as communication modes in radio communication systems that are partially or entirely different from each other.

For example, FIG. 1 illustrates radio communication apparatuses (in-vehicle apparatuses) 100a, 100b, and 100c respectively mounted on three vehicles 10A, 10B and 10C. In FIG. 1, three vehicles 10A, 10B and 10C are traveling in the same direction (e.g., in the right direction of FIG. 1). Note that the "in-vehicle apparatus" is sometimes referred to as an "on-board unit (OBU)". Note also that the "vehicle" may be referred to as a "moving object" or "mobility".

In-vehicle apparatus 100a of leading vehicle 10A performs communication (inter-vehicle communication or communication between moving objects) with in-vehicle apparatus 100b of following vehicle 10B when vehicle 10B is located within a communication area of in-vehicle apparatus 100a.

Likewise, in-vehicle apparatus 100b of vehicle 10B performs communication (inter-vehicle communication) with in-vehicle apparatus 100c of following vehicle 10C when vehicle 10C is located within a communication area of in-vehicle apparatus 100b.

Note that vehicle 10B (in-vehicle apparatus 100b) located between vehicle 10A and vehicle 10C performs individual communication with leading vehicle 10A (in-vehicle apparatus 100a) and following vehicle 10C (in-vehicle apparatus 100c) sometimes, and relays (or forwards) communication between leading vehicle 10A (in-vehicle apparatus 100a) and following vehicle 10C (in-vehicle apparatus 100c) other times. The inter-vehicle communication including the latter relay communication may be referred to as "V2V2V communication".

Meanwhile, FIG. 2 illustrates radio communication apparatuses (in-vehicle apparatuses) 100b and 100c respectively mounted on two vehicles 10B and 10C, and a single roadside apparatus 200, for example. In FIG. 2, two vehicles 10B and 10C are traveling in the same direction (e.g., the direction approaching roadside apparatus 200).

Note that the "roadside apparatus" may also be referred to as a "roadside unit (RSU)" or an "ITS spot". The "ITS" is an abbreviation for "intelligent transport systems". Roadside apparatus 200 is placed, for example, in road equipment (infrastructure) on the shoulder.

In FIG. 2, roadside apparatus 200 performs communication (roadside-to-vehicle communication) with in-vehicle apparatus 100b of vehicle 10B when in-vehicle apparatus 100b is located within a communication area of roadside apparatus 200. In addition, in-vehicle apparatus 100b of vehicle 10B performs communication (inter-vehicle communication) with in-vehicle apparatus 100c of following vehicle 10C when vehicle 10C is located within a communication area of in-vehicle apparatus 100b.

In FIG. 2, in-vehicle apparatus 100b of vehicle 10B performs individual communication with roadside apparatus 200 and in-vehicle apparatus 100c of vehicle 10C sometimes, and relays (or forwards) communication between roadside apparatus 200 and in-vehicle apparatus 100c other times. The latter relay communication may be referred to as "I2V2V communication" or "V2V2I communication".

For example, millimeter-wave band radio waves with directivity may be used for the inter-vehicle communication or the roadside-to-vehicle communication illustrated in FIG. 1 or FIG. 2. As a non-limiting example, a millimeter-band radio apparatus complied with IEEE 802.11ad or IEEE 802.11ay may be applied to each of in-vehicle apparatuses 100a, 100b, and 100c, and roadside apparatus 200. The "in-vehicle apparatus" and the "roadside apparatus" are sometimes collectively referred to as a "radio apparatus" in a case of not distinguishing one from the other.

In FIG. 1, the number of in-vehicle apparatuses 100 is not limited to three, and may be two or four or more. Also, in FIG. 2, the number of in-vehicle apparatuses 100 is not limited to two, and may be three or more. Further, in FIG. 2, the number of roadside apparatuses 200 is not limited to one, and may be two or more.

As will be described later with reference to FIG. 4, for example, in-vehicle apparatus 100 includes STA radio device (radio device) 101 that operates (or performs radio communication) in an STA mode, and PCP/AP radio device (radio device) 102 that operates (or performs radio communication) in a PCP mode or an AP mode.

As illustrated in FIGS. 1 and 2, STA radio device 101 is attached to vehicle 10 in a direction to emit radio waves to the front of vehicle 10, and PCP/AP radio device 102 is attached to vehicle 10 in a direction to emit radio waves to the back of vehicle 10.

STA radio device 101 radio-connects to PCP/AP radio device 102 of leading vehicle 10A located in front when finding PCP/AP radio device 102 of vehicle 10A. Note that STA radio device 101 finds PCP/AP radio device 102 by receiving a beacon signal (transmission signal) periodically transmitted by PCP/AP radio device 102, for example. The "beacon signal" is an example of a signal for detecting a connection destination in the inter-vehicle communication or the roadside-to-vehicle communication (the same applies to the following description).

For example, in FIG. 1, vehicle 10C establishes a radio connection (radio link) with PCP/AP radio device 102 of leading vehicle 10B when STA radio device 101 receives a beacon signal transmitted by PCP/AP radio device 102 of leading vehicle 10B.

Likewise, vehicle 10B establishes a radio connection (radio link) with PCP/AP radio device 102 of leading vehicle 10A when STA radio device 101 receives a beacon signal transmitted by PCP/AP radio device 102 of leading vehicle 10A. The same applies to the inter-vehicle communication between in-vehicle apparatus 100b and in-vehicle apparatus 100c illustrated in FIG. 2, and the radio link is established between STA radio device 101 of following vehicle 10 and PCP/AP radio device 102 of leading vehicle 10.

Non-limiting examples of services assumed in FIG. 1 include a service using uplink (UL) or downlink (DL) relay communication (V2V2V) and a service using one-on-one V2V communication.

An exemplary service using the relay communication is assumed to be a service of DL transmission of image data (a still image or a moving image) captured by a camera provided in leading vehicle 10A to following vehicles 10B and 10C in order when vehicles 10A to 10C are traveling in series. Alternatively, it is assumed to be an opposite-direction service of UL transmission of image data captured by a camera provided in last vehicle 10C to leading vehicles 10B and 10A in order.

Meanwhile, an exemplary service using the one-on-one V2V communication is assumed to be a service of DL transmission of information acquired by leading vehicle 10 (e.g., information acquired by various sensors and the image data described above) to following vehicle 10. Alternatively, it is assumed to be an opposite-direction service of UL transmission of information acquired by following vehicle 10 (e.g., information acquired by various sensors and the image data described above) to leading vehicle 10.

In FIG. 2, as will be described later with reference to FIG. 5, for example, roadside apparatus 200 includes STA radio device (radio device) 201 that operates (or performs radio communication) in the STA mode, and PCP/AP radio device (radio device) 202 that operates (or performs radio communication) in the PCP mode or the AP mode.

As illustrated in FIG. 2, for example, STA radio device 201 of roadside apparatus 200 emits radio waves toward a side where traveling vehicle 10 moves away from roadside apparatus 200. This forms communication area #1 on the side where traveling vehicle 10 moves away from roadside apparatus 200.

PCP/AP radio device 202 of roadside apparatus 200 emits radio waves, for example, toward a side where traveling vehicle 10 approaches roadside apparatus 200. This forms communication area #2 on the side where traveling vehicle 10 approaches roadside apparatus 200.

Thus, in FIG. 2, vehicle 10B approaching roadside apparatus 200 establishes a radio link with PCP/AP radio device 202 when entering communication area #2 and receiving a beacon signal transmitted from PCP/AP radio device 202 by STA radio device 101.

Non-limiting examples of services assumed in FIG. 2 include a service using UL or DL relay communication (I2V2V) and a service using one-on-one I2V or V2V communication.

An exemplary service using the relay communication is assumed to be a service of DL transmission of information acquired by roadside apparatus 200 (e.g., road traffic information) to vehicles 10B and 10C in order. The information acquired by roadside apparatus 200 may include, for example, text data, audio data, and/or image data.

Exemplary image data is image data (a still image or a moving image) of the current state of an intersection captured by a camera provided in roadside apparatus 200 installed at the intersection. For example, a service of notifying vehicle 10 approaching the intersection of the image data indicating the current state of the intersection by the DL relay communication is assumed.

Another example of the service using the relay communication is assumed to be a service of UL transmission of information acquired by vehicle 10C to vehicle 10B and roadside apparatus 200 in order. The information acquired by vehicle 10 may include, for example, text data, audio data, and/or image data.

For example, information indicating a driving state or a traveling state of vehicle 10 acquired by an in-vehicle sensor and image data captured by an in-vehicle camera may be transmitted in UL. The UL relay communication allows a plurality of vehicles 10 traveling in series by automated driving to autonomously control, for example, driving conditions (speed and steering angles) of individual vehicles 10.

Meanwhile, an exemplary service using the one-on-one I2V communication is assumed to be a service of DL transmission of information acquired by roadside apparatus 200 (e.g., information and image data acquired by various sensors) to vehicle 10. Alternatively, it is assumed to be an opposite-direction service of UL transmission of information acquired by vehicle 10 (e.g., information and image data acquired by various sensors) to roadside apparatus 200.

The next to be discussed is a case where vehicle 10A passes through roadside apparatus 200, for example, as illustrated in FIG. 3.

When vehicle 10A enters communication area #2, passes through roadside apparatus 200, and enters communication area #1, roadside apparatus 200 establishes a radio link with PCP/AP radio device 102 of vehicle 10A by STA radio device 201.

For example, STA radio device 201 establishes the radio link with PCP/AP radio device 102 of vehicle 10A by receiving a beacon signal transmitted from PCP/AP radio device 102 of vehicle 10A.

As a result, vehicle 10A can continue the communication until leaving communication area #1 even after entering communication area #2 and passing through roadside apparatus 200. This substantially expands the communication area for vehicle 10, and extends the communication duration. The extension of the communication duration accordingly increases the total transmission amount in the radio communication system.

Meanwhile, in FIG. 3, when vehicle 10B approaches roadside apparatus 200 and enters communication area #2, roadside apparatus 200 establishes a radio link with STA radio device 101 of vehicle 10B by PCP/AP radio device 202.

For example, vehicle 10B receives, by entering communication area #2 of roadside apparatus 200, a beacon signal transmitted from PCP/AP radio device 202 of roadside apparatus 200 by STA radio device 101.

Upon the reception of the beacon signal, STA radio device 101 of vehicle 10B finds roadside apparatus 200 (PCP/AP radio device 202), and establishes the radio link with PCP/AP radio device 202 of roadside apparatus 200.

As described above, for the communication with leading vehicle 10 or roadside apparatus 200, in-vehicle apparatus 100 establishes a radio link with PCP/AP radio device 102 of leading vehicle 10 or PCP/AP radio device 202 of roadside apparatus 200 using STA radio device 101.

In addition, for the communication with following vehicle 10 or roadside apparatus 200, in-vehicle apparatus 100 establishes a radio link with STA radio device 101 of following vehicle 10 or STA radio device 201 of roadside apparatus 200 using PCP/AP radio device 102.

Note that, in FIG. 3, roadside apparatus 200 may relay (or forward) the communication between in-vehicle apparatus 100a of leading vehicle 10A and in-vehicle apparatus 100b of following vehicle 10B. Such relay communication may be referred to as "V2I2V communication".

(Configuration of In-Vehicle Apparatus 100)

Next, an exemplary configuration of in-vehicle apparatus 100 will be described. FIG. 4 is a block diagram illustrating the exemplary configuration of in-vehicle apparatus 100 according to Embodiment 1.

Figure 4:
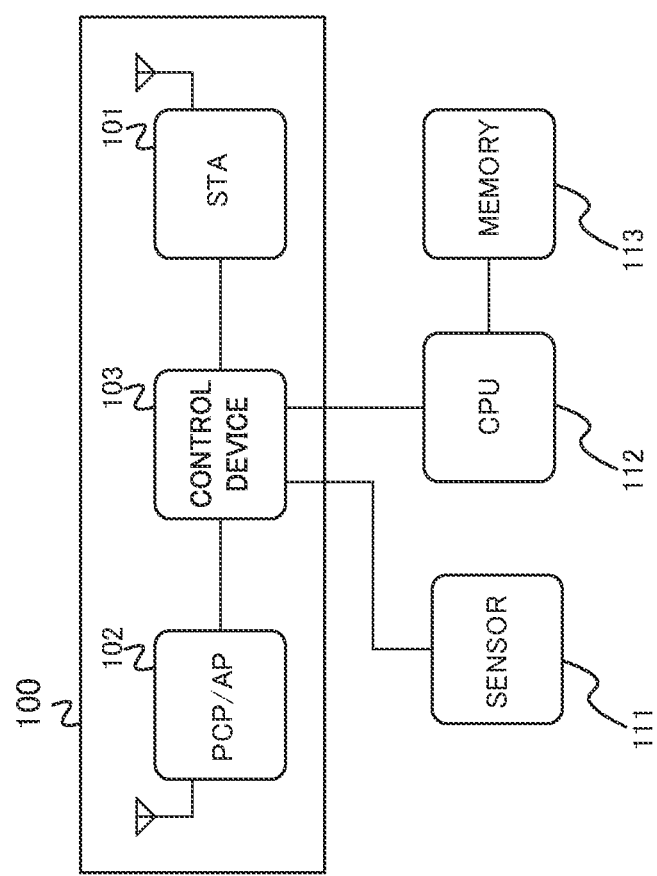
FIG. 4 is a block diagram illustrating an exemplary configuration of an in-vehicle apparatus.

As illustrated in FIG. 4, in-vehicle apparatus 100 includes, for example, radio communication device (STA radio device) 101 operating in the STA mode, radio communication device (PCP/AP radio device) 102 operating in the PCP mode or the AP mode, and control device 103.

STA radio device 101 performs radio communication (inter-vehicle communication or roadside-to-vehicle communication) by connecting to PCP/AP radio device 102 mounted on another vehicle (e.g., leading vehicle) 10 or PCP/AP radio device 202 (see FIG. 5) mounted on roadside apparatus 200.

PCP/AP radio device 102 performs radio communication (inter-vehicle communication or roadside-to-vehicle communication) by connecting to STA radio device 101 mounted on another vehicle (e.g., following vehicle) 10 or STA radio device 201 (see FIG. 5) mounted on roadside apparatus 200.

STA radio device 101 and PCP/AP radio device 102 are examples of the first radio device and the second radio device respectively in in-vehicle apparatus 100.

Control device 103 controls, for example, the radio communication by STA radio device 101 and PCP/AP radio device 102. This radio communication control may exemplarily include beamforming, and sweep control of a directional beam by beamforming. The sweep control of a directional beam may exemplarily include sweep control in an elevation direction.

Control device 103 may be connected to one or more in-vehicle apparatuses mounted on vehicle 10. Examples of the in-vehicle apparatuses include a sensor, a central processing unit (CPU), an electronic control unit (ECU), a memory, and storage. By way of example, control device 103 is connected to sensor (in-vehicle sensor) 111 and CPU 112 mounted on vehicle 10 in FIG. 4.

CPU 112 may control communication operations of STA radio device 101 and PCP/AP radio device 102 cooperating with control device 103, for example.

Memory 113 connected to CPU 112 stores, for example, data for controlling the driving of vehicle 10 and data for controlling the communication operations of STA radio device 101 and PCP/AP radio device 102. Memory 113 may also store, for example, information or data received (acquired) from the communication by STA radio device 101 and PCP/AP radio device 102.

Transmission and reception of the information and data between STA radio device 101 and PCP/AP radio device 102 are exemplarily performed via control device 103. Control device 103 may thus include a layer 2 (L2) switch, a layer 3 (L3) switch, or a router. Control device 103 may also include a CPU for exchanging data in an application layer.

For example, at least one of the following may be applied as sensor 111: a camera; a radar; light detection and ranging (LiDAR); a sonar; an ultrasonic sensor; a global navigation satellite system (GNSS); and a global positioning system (GPS).

(Configuration of Roadside Apparatus 200)

Next, an exemplary configuration of roadside apparatus 200 will be described. FIG. 5 is a block diagram illustrating the exemplary configuration of roadside apparatus 200 according to Embodiment 1.

Figure 5:
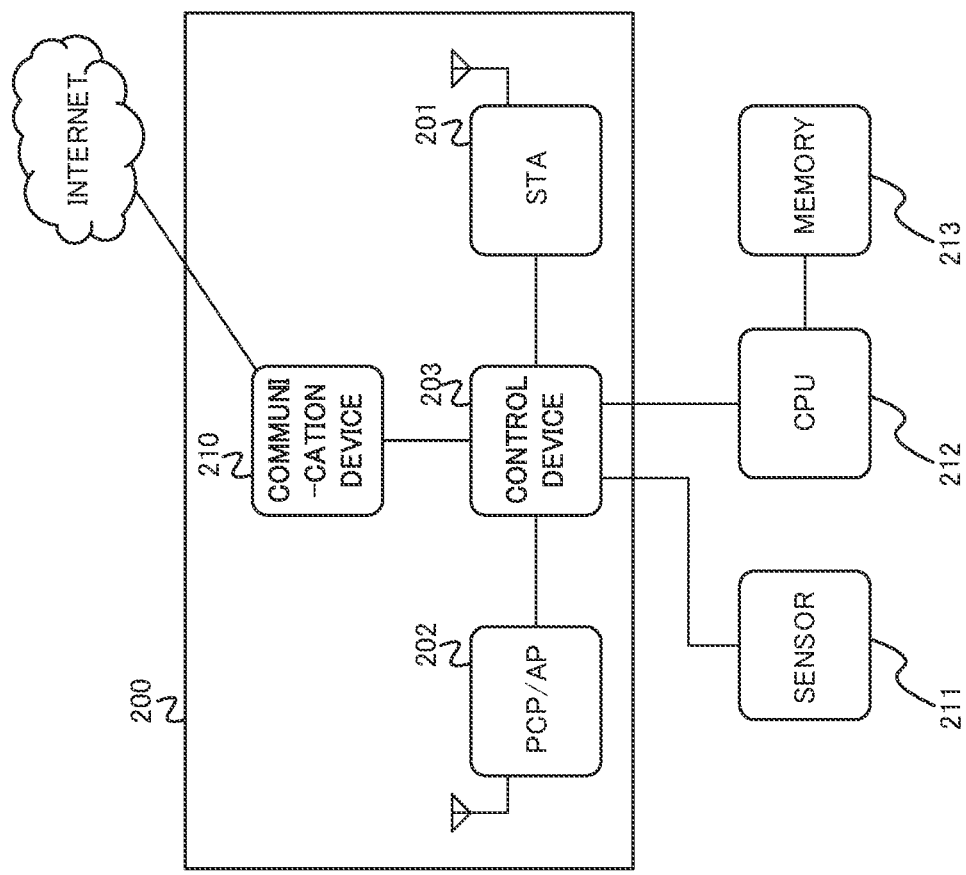
FIG. 5 is a block diagram illustrating an exemplary configuration of a roadside apparatus.

As illustrated in FIG. 5, roadside apparatus 200 includes, for example, radio communication device (STA radio device) 201 operating in the STA mode, radio communication device (PCP/AP radio device) 202 operating in the PCP mode or the AP mode, control device 203, and communication device 210.

As described above with reference to FIG. 2, STA radio device 201 forms communication area #1, and connects to PCP/AP radio device 102 of vehicle 10 located in communication area #1 to perform radio communication (roadside-to-vehicle communication).

Also as described above in FIG. 2, PCP/AP radio device 202 forms communication area #2, and connects to STA radio device 101 of vehicle 10 located in communication area #2 to perform radio communication (roadside-to-vehicle communication).

STA radio device 201 and PCP/AP radio device 202 are examples of the first radio device and the second radio device respectively in roadside apparatus 200.

Communication device 210 communicates with an external network such as the Internet. The connection between communication device 210 and the external network may be wired or wireless. Note that the external network may be connected to control device 203 without using communication device 210 in a case of wired connection. In other words, control device 203 may be provided with an interface (IF) for wired connection.

Control device 203 controls, for example, radio communication by STA radio device 201 and PCP/AP radio device 202. This radio communication control may include beamforming, and sweep control of a directional beam by beamforming. The sweep control of a directional beam may exemplarily include sweep control in an elevation direction.

Control device 203 may be connected to one or more devices mounted on roadside apparatus 200. Examples of the devices mounted on roadside apparatus 200 include a sensor, a CPU, a memory, and storage. By way of example, control device 203 is connected to sensor 211 and CPU 212 mounted on roadside apparatus 200 in FIG. 5.

CPU 112 may control communication operations of STA radio device 201, PCP/AP radio device 202, and communication device 210 cooperating with control device 203, for example.

Memory 213 connected to CPU 212 stores, for example, data for controlling an operation of roadside apparatus 200, data for controlling the communication operations of STA radio device 201, PCP/AP radio device 202, and communication device 210. Memory 213 may also store, for example, information or data received (acquired) from the communication by STA radio device 201, PCP/AP radio device 202 and communication device 210.

Transmission and reception of the information and data among STA radio device 201, PCP/AP radio device 202, and communication device 210 are exemplarily performed via control device 203. Control device 203 may thus include an L2 switch, an L3 switch, or a router. Control device 203 may also include a CPU for exchanging data in an application layer.

For example, at least one of the following may be applied as sensor 211: a camera; a radar; LiDAR; a sonar; an ultrasonic sensor; a GNSS; and a GPS.

Note that, in the configurations of in-vehicle apparatus 100 and roadside apparatus 200 described above, the "PCP/AP radio device" may be replaced with a "base station" and the "STA radio device" may be replaced with a "terminal".

Exemplary Operations

The following is itemized descriptions of an exemplary operation of in-vehicle apparatus 100 and an exemplary operation of roadside apparatus 200.

(Exemplary Operation of In-Vehicle Apparatus 100)

Figure 6A:
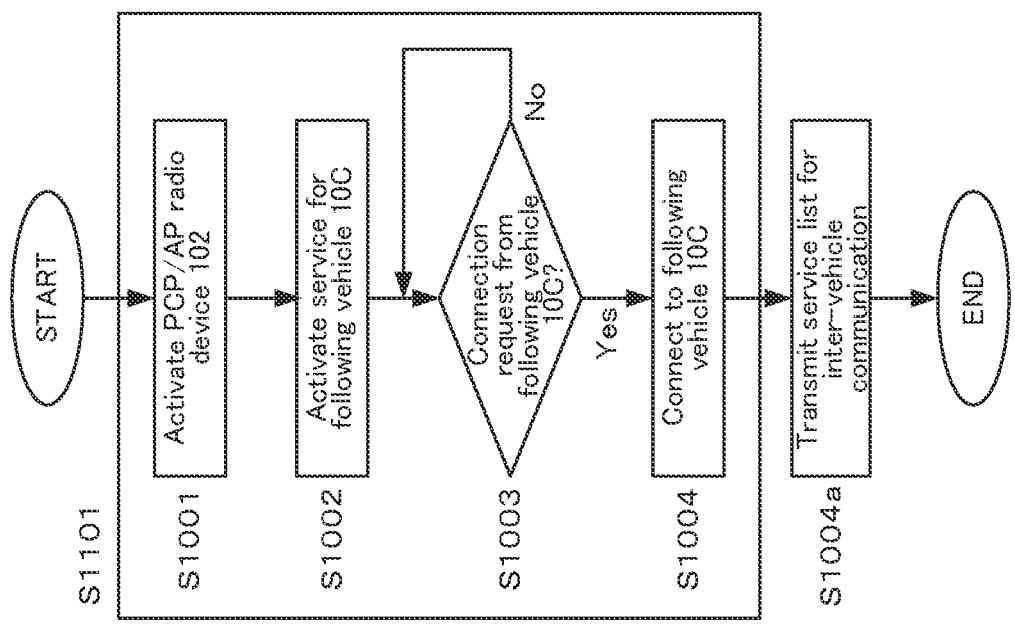
FIG. 6A is a flowchart describing an exemplary operation of the in-vehicle apparatus.
Figure 6B:
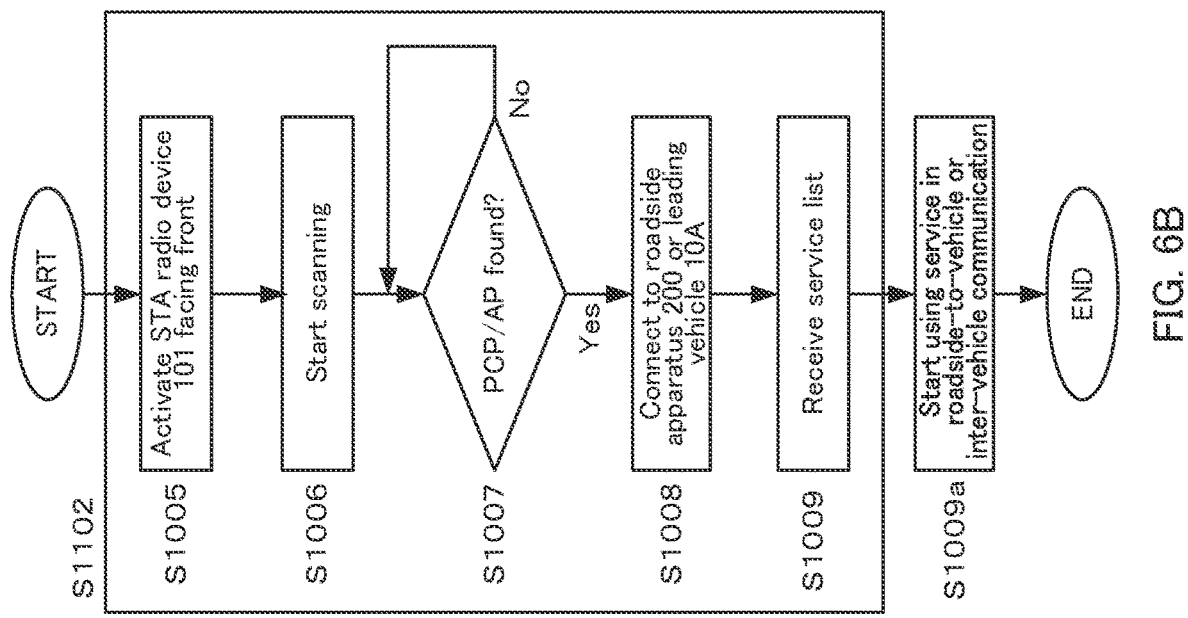
FIG. 6B is a flowchart describing another exemplary operation of the in-vehicle apparatus.
Figure 6C:
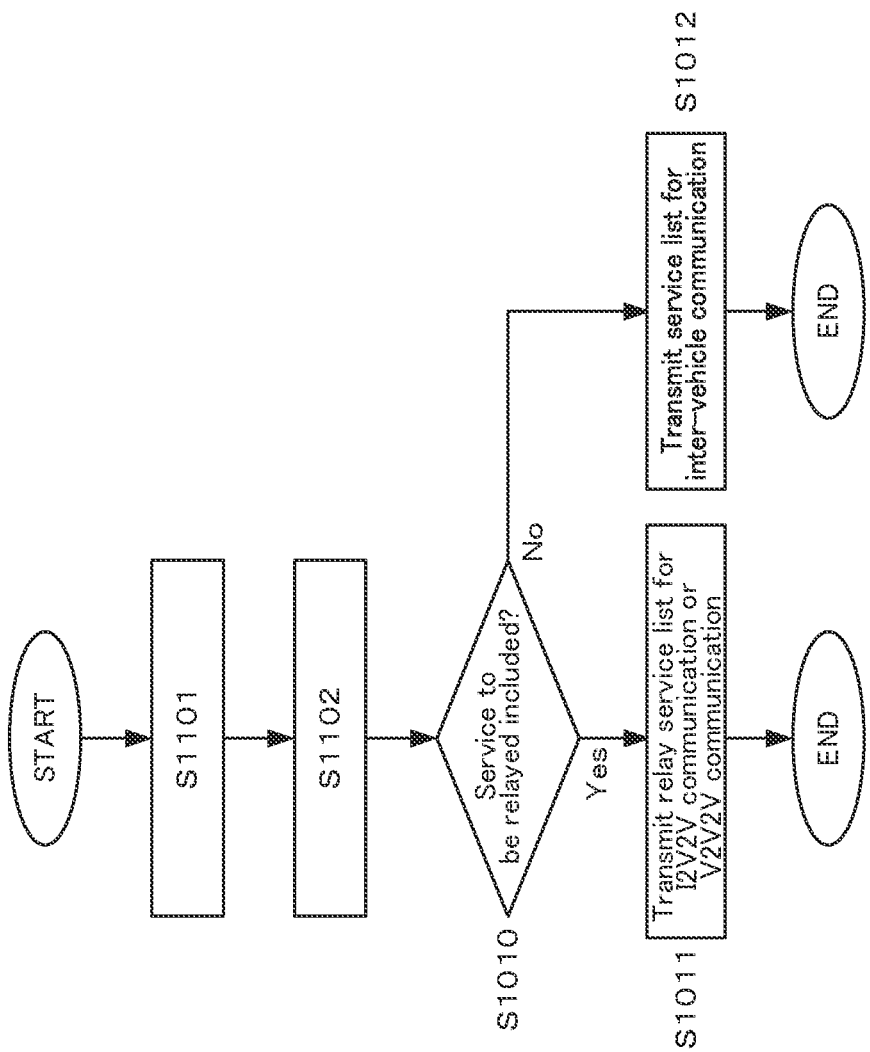
FIG. 6C is a flowchart describing still another exemplary operation of the in-vehicle apparatus.

FIGS. 6A, 6B, and 6C are flowcharts each illustrating an exemplary operation of in-vehicle apparatus 100 according to Embodiment 1. FIGS. 6A to 6C exemplarily illustrate operation examples of in-vehicle apparatus 100b mounted on vehicle 10B illustrated in FIGS. 1 and 2.

For example, FIG. 6A illustrates an exemplary operation in a case where in-vehicle apparatus 100b of vehicle 10B performs one-on-one communication (V2V communication) with in-vehicle apparatus 100c of following vehicle 10C in FIGS. 1 and 2.

FIG. 6B illustrates an exemplary operation in a case where in-vehicle apparatus 100b of vehicle 10B performs one-on-one communication (V2I communication) with roadside apparatus 200 in FIG. 2, or in a case where in-vehicle apparatus 100b of vehicle 10B performs one-on-one communication (V2V communication) with in-vehicle apparatus 100a of leading vehicle 10A in FIG. 1.

FIG. 6C illustrates an exemplary operation in a case where in-vehicle apparatus 100b of vehicle 10B relays communication (I2V2V communication) between roadside apparatus 200 and in-vehicle apparatus 100c of following vehicle 10C in FIG. 2, or in a case where in-vehicle apparatus 100b of vehicle 10B relays communication (V2V2V communication) between in-vehicle apparatus 100a of leading vehicle 10A and in-vehicle apparatus 100c of following vehicle 10C in FIG. 1.

(V2V communication: FIG. 6A)

As illustrated in FIG. 6A, in-vehicle apparatus 100b of vehicle 10B activates PCP/AP radio device 102 provided toward the back of vehicle 10B in S1001. After the activation, PCP/AP radio device 102 periodically transmits radio waves, e.g., beacon signals. By way of non-limiting example, the transmission period of the beacon signals is approximately 100 ms.

In S1002, in-vehicle apparatus 100b activates a service (or application) to be provided after establishing a connection with in-vehicle apparatus 100c of following vehicle 10C in control device 103, for example. The activation of a service causes PCP/AP radio device 102 to be in a stand-by state for a connection (service) request from following vehicle 10C.

For example, in-vehicle apparatus 100b of vehicle 10B monitors whether the connection request is received from following vehicle 10C (STA radio device 101) in S1003. When no connection request is received from following vehicle 10C (No in S1003), in-vehicle apparatus 100b continues monitoring the reception of the connection request.

When the connection request is received from following vehicle 10C (Yes in S1003), in contrast, in-vehicle apparatus 100b accepts the connection request, and establishes a radio connection with following vehicle 10C (STA radio device 101) in S1004.

Note that the processes from S1001 to S1004 described above are denoted as S1101 for convenience, as illustrated in FIG. 6A.

After establishing the radio connection, in-vehicle apparatus 100b transmits, to following vehicle 10C in S1004a, a list of services (hereinafter, sometimes referred to as the a "service candidate list") that vehicle 10B can provide by V2V communication. The service candidate list includes at least one service. After transmitting the service candidate list, in-vehicle apparatus 100b starts at least one service by DL V2V communication included in the transmitted service candidate list.

The "start" of the "service" here means, for example, being ready for providing a service corresponding to a request when there is a request on service provision (hereinafter, sometimes referred to as a "service request"), in other words, starting to stand by for the service request. The service provision may be regarded as, for example, transmission of information or data corresponding to the service.

Note that in-vehicle apparatus 100c (STA radio device 101) of following vehicle 10C may transmit a service candidate list to in-vehicle apparatus 100b (PCP/AP radio device 102) of vehicle 10B after the radio connection is established in S1004. In this case, a service by UL V2V communication is started.

Non-limiting examples of the service by the V2V communication include a service on driving safety support systems, a sensor data sharing service, and a distribution service of an image and/or a video by a dashboard camera and an in-vehicle camera.

Note that the exemplary operation illustrated in FIG. 6A may be applied to the V2V communication between in-vehicle apparatus 100a and in-vehicle apparatus 100b. In the exemplary operation described above with reference to FIG. 6A, for example, in-vehicle apparatus 100b and in-vehicle apparatus 100c may be replaced with in-vehicle apparatus 100a and in-vehicle apparatus 100b respectively. In other words, the exemplary operation described above with reference to FIG. 6A may be applied to the V2V communication between any vehicles 10 when three or more in-vehicle apparatuses 100 are located within the communication areas of each other.

(V2I Communication or V2V Communication: FIG. 6B)

Next, an exemplary operation in FIG. 6B will be described. As illustrated in FIG. 6B, in-vehicle apparatus 100b of vehicle 10B activates STA radio device 101 provided toward the front of vehicle 10B in S1005.

Note that, in vehicle 10B, STA radio device 101 and PCP/AP radio device 102 may be activated in any order, or may be activated in parallel. In other words, the process of S1001 in FIG. 6A and the process of S1005 in FIG. 6B may be performed in any order, or may be performed in parallel.

After the activation of STA radio device 101, in-vehicle apparatus 100b starts scanning a radio wave with STA radio device 101 in S1006, and searches for a beacon signal periodically transmitted by roadside apparatus 200 or another vehicle 10 (e.g., leading vehicle 10A) in the PCP/AP mode.

For example, in-vehicle apparatus 100b monitors whether the beacon signal is received in S1007. When no beacon signal is received (No in S1007), in-vehicle apparatus 100b repeats the scanning until the beacon signal is received, in other words, until a source radio device of the beacon signal (hereinafter, sometimes simply referred to as a "beacon source radio device") is found.

When the beacon signal is received (Yes in S1007), in-vehicle apparatus 100b establishes a radio connection with the found beacon source radio device in S1008. The beacon source radio device is, for example, PCP/AP radio device 202 of roadside apparatus 200 or PCP/AP radio device 102 in in-vehicle apparatus 100a of leading vehicle 10A.

Note that in-vehicle apparatus 100b sometimes finds a plurality of beacon source radio devices in S1007 depending on the surroundings of vehicle 10B. When a plurality of beacon source radio devices are found, in-vehicle apparatus 100b may select and determine, for example, a source radio device of a beacon signal with high reception quality as a connection destination. Alternatively, the connection destination (roadside apparatus 200 or in-vehicle apparatus 100) may be selected and determined by a user, for example. When there are a plurality of connection destination candidates (e.g., a plurality of in-vehicle apparatuses), a particular in-vehicle apparatus may be selected and determined by a user. The selection and determination of the connection destination by the user may be performed, for example, through a selection operation input of the connection destination to control device 103 by an occupant of vehicle 10B.

Note that examples of the "reception quality" include a Signal Noise Ratio (SNR) and Received Signal Strength Indication (Received Signal Strength Indicator (RSSI)).

After establishing the radio connection with the found beacon source radio device, in-vehicle apparatus 100b receives, in S1009, a list of service candidates that the connection destination can provide from the connection destination, which is roadside apparatus 200 or leading vehicle 10A. This service candidate list includes at least one service.

Note that the processes from S1005 to S1009 are denoted as S1102 for convenience, as illustrated in FIG. 6B.

After receiving the service candidate list, in-vehicle apparatus 100b selects at least one service from the service candidate list received from the connection destination and starts using the selected service in S1009a. This is the start of a service by DL V2I communication or DL V2V communication.

Note that the selection of the service in the service candidate list may be performed autonomously in control device 103 according to predetermined selection criteria or a selection rule, for example, or may be performed through a manual selection operation on the service candidate list by an occupant (e.g., driver) of vehicle 10B. The selection criteria or the selection rule may be inputted and set in advance to control device 103 by an occupant of vehicle 10B, for example.

Note that in-vehicle apparatus 100b (STA radio device 101) of vehicle 10B may transmit a service candidate list to roadside apparatus 200 (PCP/AP radio device 202) or in-vehicle apparatus 100 (PCP/AP radio device 102) of leading vehicle 10 after the radio connection is established in S1008. In this case, a service by UL V2I communication or UL V2V communication is started.

Non-limiting examples of the service by the V2I communication include an Internet connection service, an automatic toll payment service using electric toll collection (ETC), a service on driving safety support systems, a sensor data sharing service, a software and firmware update service, a map distribution service, a distribution service of an image and/or a video by a surveillance camera and a roadside camera, and a traffic information distribution service.

(Relay Communication: FIG. 6C)

Next, an exemplary operation of relay communication will be described with reference to FIG. 6C. As illustrated in FIG. 6C, S1101 (see FIG. 6A) and S1102 (see FIG. 6B), for example, are performed in the relay communication. S1101 and S1102 may be performed in any order, or may be performed in parallel.

In S1010, in-vehicle apparatus 100b determines whether a service that can be relayed (or forwarded) to following vehicle 10C (in-vehicle apparatus 100c) is included in the service candidate list received in S1009 in FIG. 6B.

When the service that can be relayed (or forwarded) to following vehicle 10C (in-vehicle apparatus 100c) is included (Yes in S1010), in-vehicle apparatus 100b transmits a list of services by the relay communication (hereinafter, sometimes referred to as "relay services") to following vehicle 10C in S1011. After transmitting the list, in-vehicle apparatus 100b starts at least one service by DL I2V2V communication or DL V2V2V communication included in the transmitted list.

When no service that can be relayed (or forwarded) to following vehicle 10C (in-vehicle apparatus 100c) is included (No in S1010), in contrast, in-vehicle apparatus 100b may transmit, to following vehicle 10C (in-vehicle apparatus 100c) in S1012, a list of service candidates that can be provided from vehicle 10B to following vehicle 10C, for example. The transmission of the service candidate list may be regarded as a process equivalent to S1004a in FIG. 6A.

Note that, in the case of "No" in S1010, in-vehicle apparatus 100b may additionally or alternatively transmit, to in-vehicle apparatus 100c of following vehicle 10C, information indicating that no service that can be relayed (or forwarded) to following vehicle 10C (in-vehicle apparatus 100c) is included.

Non-limiting examples of the relay service include an image/video transmission service in traveling in series and a see-through image/video service at an intersection. For example, following vehicle 10 can check a condition in front of leading vehicle 10 during a traffic jam or when traveling in series by receiving a front camera image from leading vehicle 10 through the relay service.

In addition, leading vehicle 10 can check a condition behind last vehicle 10 by receiving a rear camera image of last vehicle 10, for example. This facilitates supporting driving safety. Further, even when following vehicle 10 fails to establish a radio connection directly with roadside apparatus 200 due to an effect of blockage by leading vehicle 10, following vehicle 10 can share the information provided from roadside apparatus 200 to leading vehicle 10 by receiving the relay service from leading vehicle 10.

(Exemplary Operation of Roadside Apparatus 200)

Figure 7A:
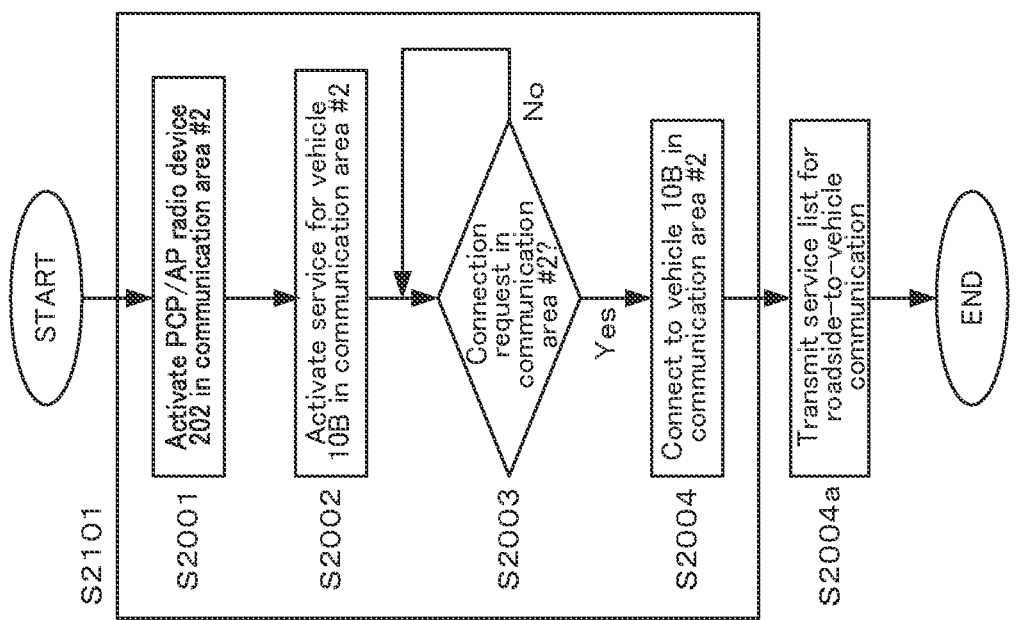
FIG. 7A is a flowchart describing an exemplary operation of the roadside apparatus.
Figure 7B:
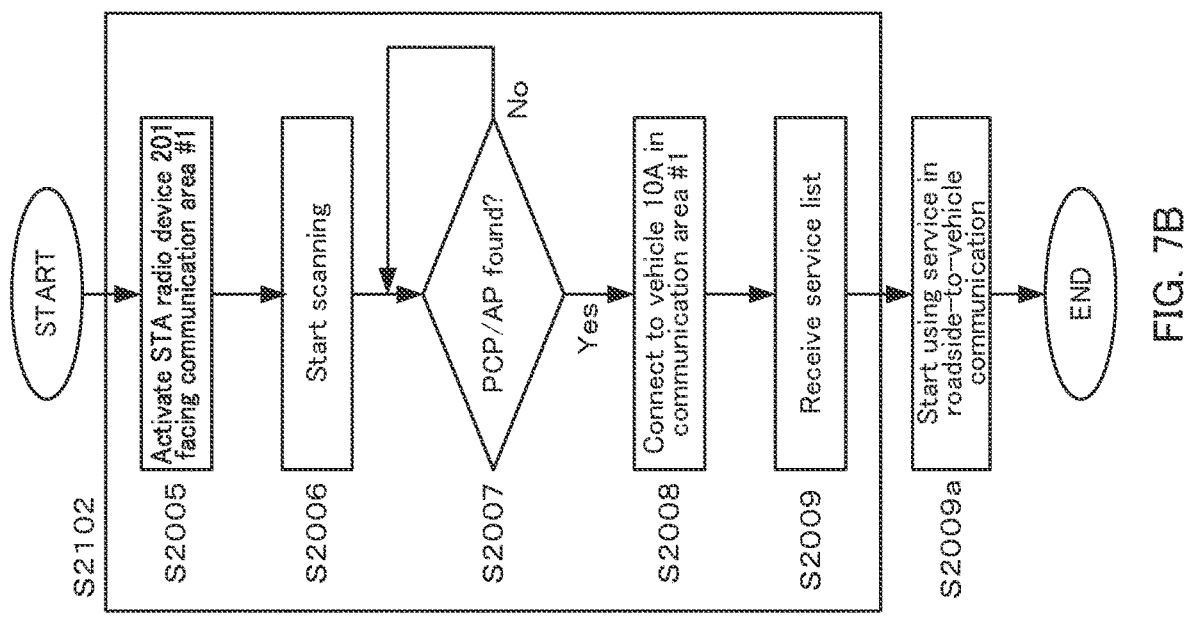
FIG. 7B is a flowchart describing another exemplary operation of the roadside apparatus.
Figure 7C:
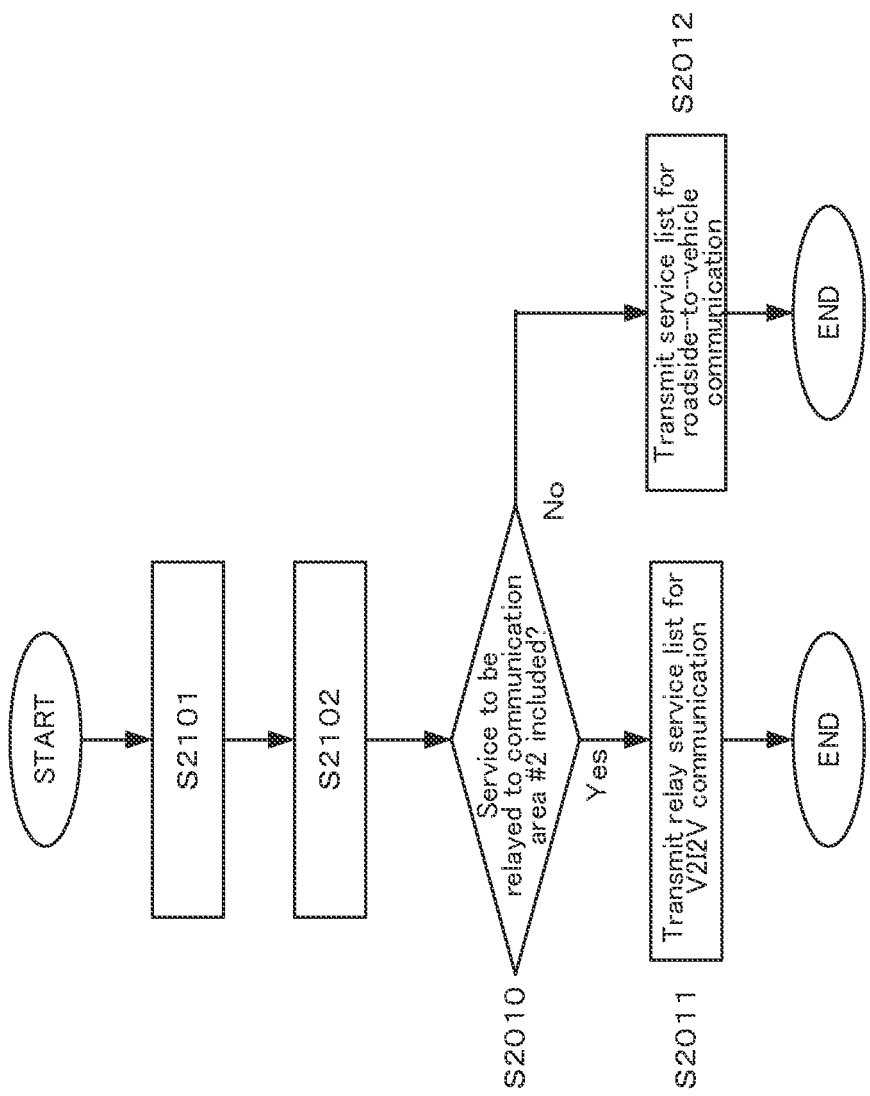
FIG. 7C is a flowchart describing still another exemplary operation of the roadside apparatus.

The following is a description of exemplary operations of roadside apparatus 200 according to Embodiment 1 with reference to flowcharts in FIGS. 7A, 7B, and 7C.

For example, FIG. 7A illustrates an exemplary operation in a case where roadside apparatus 200 performs one-on-one communication (I2V communication) with in-vehicle apparatus 100b of vehicle 10B located in communication area #2 in FIG. 3.

FIG. 7B illustrates an exemplary operation in a case where roadside apparatus 200 performs one-on-one communication (I2V communication) with in-vehicle apparatus 100a of vehicle 10A located in communication area #1 in FIG. 3.

FIG. 7C illustrates an exemplary operation in a case where roadside apparatus 200 relays communication (V2I2V communication) between in-vehicle apparatus 100a of vehicle 10A and in-vehicle apparatus 100b of vehicle 10B in FIG. 3.

(I2V communication: FIG. 7A)

As illustrated in FIG. 7A, roadside apparatus 200 activates PCP/AP radio device 202 provided toward a side where vehicle 10 approaches roadside apparatus 200 in S2001. After the activation, PCP/AP radio device 202 periodically transmits radio waves, e.g., beacon signals. By way of non-limiting example, the transmission period of the beacon signals is 100 ms. This forms communication area #2 on the side where vehicle 10 approaches roadside apparatus 200, as illustrated in FIGS. 2 and 3.

Subsequently, roadside apparatus 200 activates a service (or an application) to be provided after establishing a connection with in-vehicle apparatus 100 of vehicle 10 (e.g., in-vehicle apparatus 100b of vehicle 10B illustrated in FIGS. 2 and 3) located in communication area #2 in control device 203, for example (S2002). The activation of the service causes roadside apparatus 200 (PCP/AP radio device 202) to be in a stand-by state for a connection (service) request from vehicle 10B (in-vehicle apparatus 100b).

For example, roadside apparatus 200 monitors whether the connection request is received from in-vehicle apparatus 100b (STA radio device 101) of vehicle 10B located in communication area #2 in S2003. When no connection request is received from vehicle 10B (No in S2003), roadside apparatus 200 continues monitoring the reception of the connection request.

When the connection request is received from vehicle 10B (Yes in S2003), in contrast, roadside apparatus 200 accepts the connection request, and establishes a radio connection with in-vehicle apparatus 100b (STA radio device 101) of vehicle 10B located in communication area #2 in S2004.

Note that the processes from S2001 to S2004 are denoted as S2101 for convenience, as illustrated in FIG. 7A.

After establishing the radio connection, roadside apparatus 200 (PCP/AP radio device 202) transmits, to vehicle 10B (in-vehicle apparatus 100b) in S2004a, a list of services (service candidate list) that roadside apparatus 200 can provide by roadside-to-vehicle communication. The service candidate list includes at least one service. After transmitting the service candidate list, roadside apparatus 200 starts at least one service by DL I2V communication included in the transmitted service candidate list.

Note that in-vehicle apparatus 100b (STA radio device 101) of vehicle 10B may transmit a service candidate list to roadside apparatus 200 (PCP/AP radio device 202) after the radio connection is established in S2004. In this case, a service by UL V2I communication is started.

Non-limiting examples of the service by the V2I communication include, as previously described with reference to FIG. 6A, an Internet connection service, an automatic toll payment service using ETC, a service on driving safety support systems, a sensor data sharing service, a software and firmware update service, a map distribution service, a distribution service of an image and/or a video by a surveillance camera and a roadside camera, and a traffic information distribution service.

(I2V Communication: FIG. 7B)

The following is a description, with reference to FIG. 7B, of an exemplary operation in the case where roadside apparatus 200 performs one-on-one communication (I2V communication) with in-vehicle apparatus 100a of vehicle 10A located in communication area #1 in FIG. 3, for example.

As illustrated in FIG. 7B, roadside apparatus 200 activates STA radio device 201 provided toward a side where vehicle 10 moves away from roadside apparatus 200 in S2005. After the activation of STA radio device 201, roadside apparatus 200 starts scanning a radio wave with STA radio device 201 in S2006, and searches for a beacon signal periodically transmitted by vehicle 10A (PCP/AP radio device 102 of in-vehicle device 100a) in communication area #1.

For example, roadside apparatus 200 monitors whether the beacon signal is received in S2007. When no beacon signal is received (No in S2007), roadside apparatus 200 repeats the scanning until the beacon signal is received, in other words, until PCP/AP radio device 102 is found.

When the beacon signal is received (Yes in S2007), roadside apparatus 200 establishes a radio connection with the found PCP/AP radio device 102 in S2008. Note that roadside apparatus 200 sometimes finds a plurality of PCP/AP radio devices 102 in S2007 depending on the situation in communication area #1. When a plurality of PCP/AP radio devices 102 are found, roadside apparatus 200 may select and determine, for example, source PCP/AP radio device 102 of a beacon signal with high reception quality as a connection destination.

After establishing the radio connection with PCP/AP radio device 102, roadside apparatus 200 receives, in S2009, a list of service candidates that vehicle 10A can provide from the connection destination, which is PCP/AP radio device 102 (vehicle 10A). The service candidate list includes at least one service.

Note that the processes from S2005 to S2009 are denoted as S2102 for convenience, as illustrated in FIG. 7B.

After receiving the service candidate list, roadside apparatus 200 selects at least one service from the service candidate list received from vehicle 10A, and starts using the selected service in S2009a. This starts a service by V2I communication from vehicle 10A to roadside apparatus 200.

Note that, in S2009, roadside apparatus 200 may transmit a service candidate list to in-vehicle apparatus 100a (PCP/AP radio device 102) of vehicle 10A located in communication area #1, and provide a service to vehicle 10A. In this case, a service by I2V communication from roadside apparatus 200 to vehicle 10A is started. Note that the V2I communication from vehicle 10 to roadside apparatus 200 may be referred to as UL roadside-to-vehicle communication. Likewise, the I2V communication from roadside apparatus 200 to vehicle 10 may be referred to as DL roadside-to-vehicle communication.

(Relay (V2I2V) Communication: FIG. 7C)

Next, an exemplary operation of relay communication will be described with reference to FIG. 7C. As illustrated in FIG. 7C, S2101 (see FIG. 7A) and S2102 (see FIG. 7B), for example, are performed in the relay communication. S2101 and S2102 may be performed in any order, or may be performed in parallel.

Roadside apparatus 200 determines whether a service that can be relayed (or forwarded) to vehicle 10B (in-vehicle apparatus 100b) located in communication area #2 is included in the service candidate list received in S2009 in FIG. 7B.

When the service that can be relayed (or forwarded) to vehicle 10B (in-vehicle apparatus 100b) is included (Yes in S2010), roadside apparatus 200 transmits a list of services by the relay communication (relay services) to vehicle 10B in S2011. After transmitting the list, roadside apparatus 200 starts at least one service by V2I2V communication included in the transmitted list.

When no service that can be relayed (or forwarded) to vehicle 10B (in-vehicle apparatus 100b) is included (No in S2010), in contrast, roadside apparatus 200 may transmit, to vehicle 10B (in-vehicle apparatus 100b) in S2012, a list of service candidates that can be provided by roadside-to-vehicle communication, for example. The transmission of the service candidate list may be regarded as a process equivalent to S2004a in FIG. 7A.

Note that, in the case of "No" in S2010, roadside apparatus 200 may additionally or alternatively transmit, to vehicle 10B (in-vehicle apparatus 100b), information indicating that no service that can be relayed (or forwarded) to vehicle 10B (in-vehicle apparatus 100b) is included.

Non-limiting examples of the relay service by the V2I2V communication include a service in which roadside apparatus 200 receives image/video data taken in vehicle 10A in communication area #1, and transmits the image/video data to vehicle 10B in communication area #2.

Incidentally, roadside apparatus 200 (e.g., control device 203) may perform processing such as image recognition using artificial intelligence (AI) on the image/video data received from vehicle 10A, and then transmit the processed data to vehicle 10B. Note that the AI may include machine learning and deep learning.

As described above, Embodiment 1 allows vehicle 10 to establish a radio connection with PCP/AP radio device 102 of in-vehicle apparatus 100 or PCP/AP radio device 202 of roadside apparatus 200 found ahead in the traveling direction.

Individual vehicles 10 perform radio connection with autonomously found in-vehicle apparatus 100 or roadside apparatus 200 functioning as a base station, for example, without dynamically or adaptively selecting vehicle 10 (in-vehicle apparatus 100) serving as a base station (PCP or AP) according to changes in a surrounding traffic condition.

Thus, it is possible to increase a connection success rate of an inter-vehicle or roadside-to-vehicle radio communication system as a whole. The increase in the connection success rate improves the stability or reliability of the inter-vehicle communication or roadside-to-vehicle communication.

(Exemplary Installations of STA Radio Device and PCP/AP Radio Device)

Next, a description will be given of exemplary installations of in-vehicle apparatus 100 (STA radio device 101 and PCP/AP radio device 102) in vehicle 10, with reference to FIGS. 8A and 8B. A description will also be given of exemplary installations of STA radio device 201 and PCP/AP radio device 202 in roadside apparatus 200, with reference to FIGS. 9A and 9B.

In-vehicle apparatus 100 illustrated in FIGS. 1 to 4 is configured as a single apparatus including STA radio device 101 and PCP/AP radio device 102, and is integrally installed on a part of vehicle 10 (e.g., roof) so as not to interfere with the emission of radio waves to the front and back of vehicle 10. The installation is simple since a single apparatus is installed on vehicle 10.

Figure 8A:
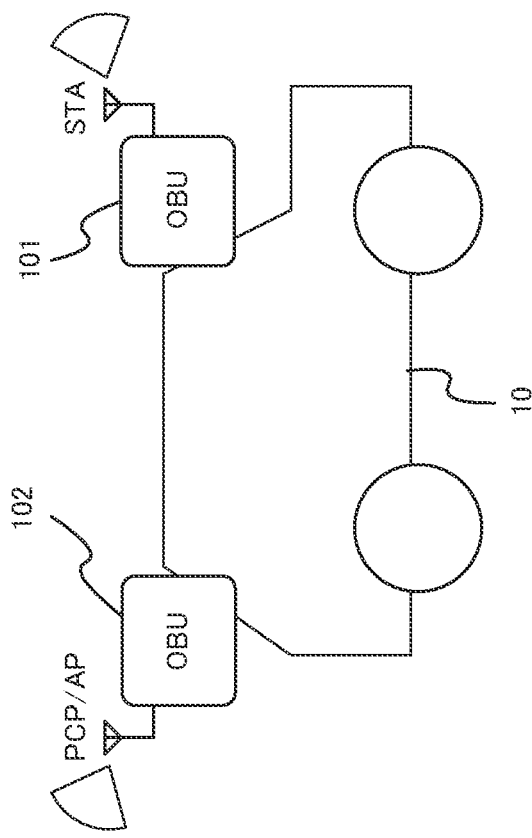
FIG. 8A illustrates an exemplary installation of the in-vehicle apparatus.
Figure 8B:
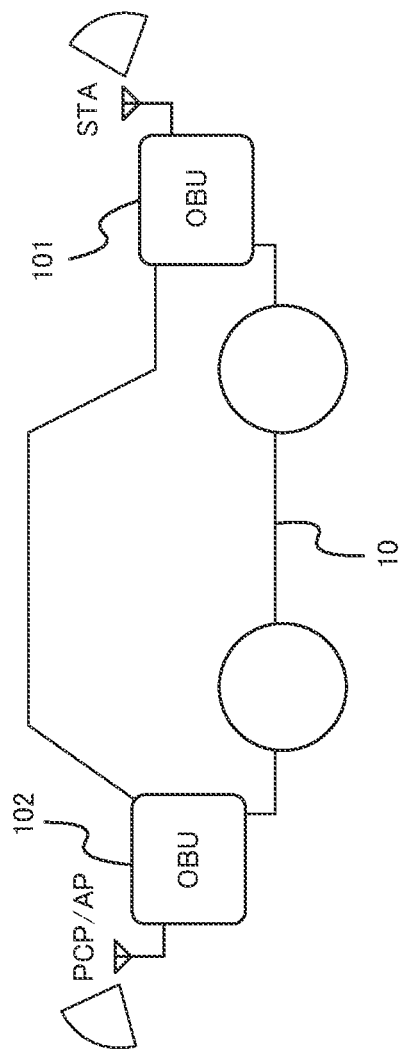
FIG. 8B illustrates another exemplary installation of the in-vehicle apparatus.

Meanwhile, STA radio device 101 and PCP/AP radio device 102 may be separately installed on vehicle 10 as individual devices, as illustrated in FIGS. 8A and 8B.

For example, STA radio device 101 that emits radio waves to the front of vehicle 10 may be installed on a front section of vehicle 10, and PCP/AP radio device 102 that emits radio waves to the back of vehicle 10 may be installed on a rear section of vehicle 10, as illustrated in FIGS. 8A and 8B.

Non-limiting examples of the position of the front section of vehicle 10 where STA radio device 101 is installed include a dashboard, a sun visor, the vicinity of a front monitoring camera, a rearview mirror, and a front bumper.

Some or all of these installation position candidates are common to installation position candidates for an in-vehicle radar apparatus (e.g., millimeter-wave radar), and thus STA radio device 101 may be integrated into the in-vehicle radar apparatus. Further, STA radio device 101 may also be integrated into the front monitoring camera.

Non-limiting examples of the position of the rear section of vehicle 10 where PCP/AP radio device 102 is installed include a shark fin antenna, the vicinity of a rear monitoring camera, a back door, and a rear bumper. PCP/AP radio device 102 may be integrated into the rear monitoring camera.

The separate installation of STA radio device 101 and PCP/AP radio device 102 on the front and rear sections of vehicle 10 as described above allows for more options or increases flexibility of the installation positions of STA radio device 101 and PCP/AP radio device 102 on vehicle 10.

In addition, the communication ranges to the front and back of vehicle 10 can be expanded compared with the case of integrally installing on the roof. Further, it is possible to reduce or avoid radio interference due to reflected waves from the vehicle body or blockage of radio waves by the vehicle body, thereby improving the stability of the communication. Large vehicles such as trucks or buses can obtain even better result of the expansion of the communication ranges or the improvement of the communication stability, compared to common small or medium-sized vehicles.

Figure 9B:
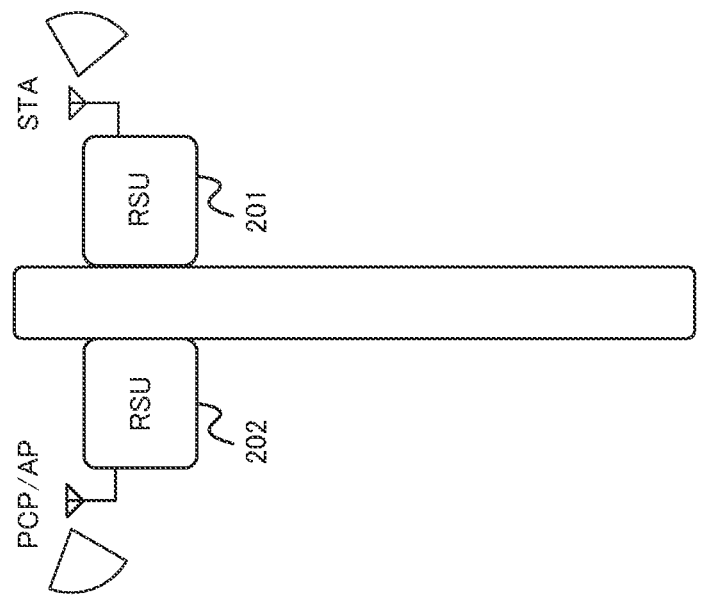
FIG. 9B illustrates another exemplary installation of the roadside apparatus.
Figure 9A:
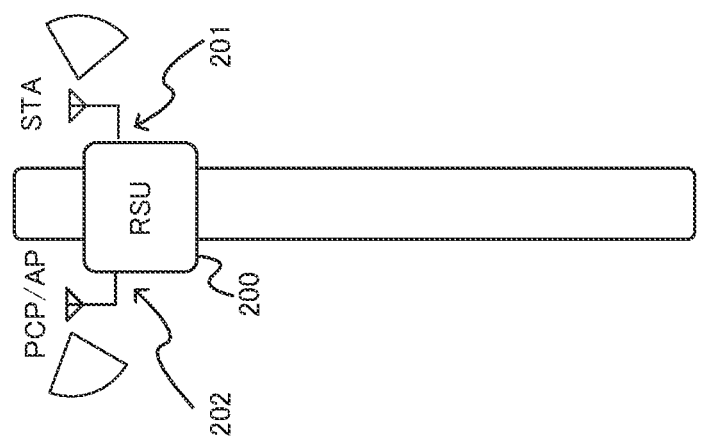
FIG. 9A illustrates an exemplary installation of the roadside apparatus.

As with in-vehicle apparatus 100, STA radio device 201 and PCP/AP radio device 202 of roadside apparatus 200 may be integrally installed or separately installed, as illustrated in FIGS. 9A and 9B.

For example, either the integral installation or the separate installation can be selected depending on the type or shape of roadside apparatus 200. Alternatively, either the integral installation or the separate installation may be selected depending on the sizes of STA radio device 201 and PCP/AP radio device 202.

It is susceptible to radio wave reflection or blockage by road equipment, for example, in a case where the size of roadside apparatus 200 (radio devices 201 and 202) is small with respect to the size of road equipment, such as a utility pole, a road sign, and a signboard, on which roadside apparatus 200 is installed.

In such a case, adopting the separate installation can reduce or avoid the effects of the radio wave reflection or blockage. Meanwhile, adopting the integrated installation can reduce the installation cost of roadside apparatus 200 in a case where the size of roadside apparatus 200 (radio devices 201 and 202) is large with respect to the size of road equipment on which roadside apparatus 200 is installed.

(Variations of In-Vehicle Apparatus and Roadside Apparatus)

Figure 10A:
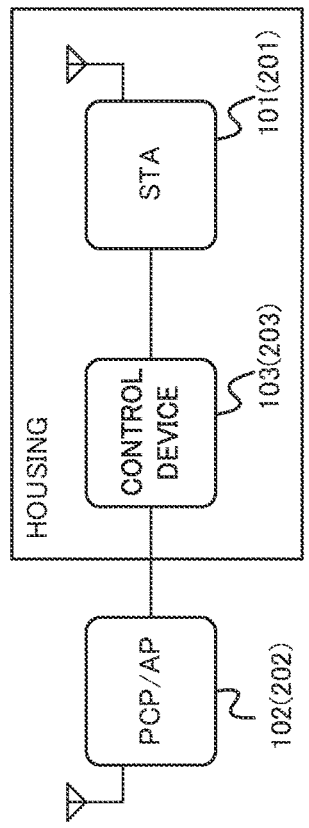
FIG. 10A is a block diagram illustrating a variation of a configuration of the in-vehicle apparatus.
Figure 10B:
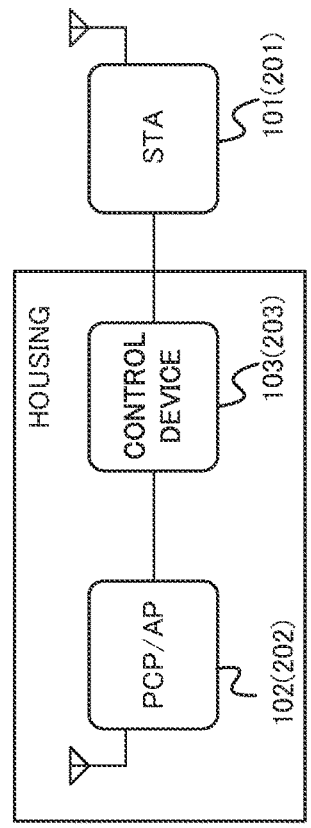
FIG. 10B is a block diagram illustrating another variation of a configuration of the in-vehicle apparatus.
Figure 10C:
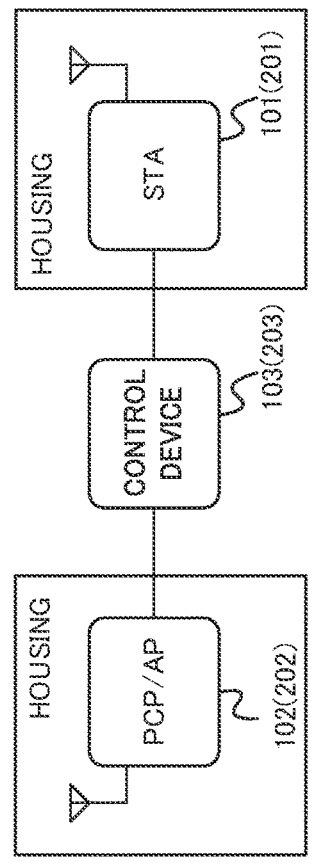
FIG. 10C is a block diagram illustrating still another variation of a configuration of the in-vehicle apparatus.

STA radio device 101 and PCP/AP radio device 102 of in-vehicle apparatus 100 may be accommodated in a single housing as illustrated in FIG. 4, or may be separately accommodated in different housings as illustrated in FIGS. 10A, 10B, and 10C, for example.

FIG. 10A illustrates an example of accommodating STA radio device 101 and control device 103 in a single housing. FIG. 10B illustrates an example of accommodating PCP/AP radio device 102 and control device 103 in a single housing. FIG. 10C illustrates an example of accommodating STA radio device 101 and PCP/AP radio device 102 in different (individual or separate) housings. Control device 103 can be installed at a position different from a position of one or both of STA radio device 101 and PCP/AP radio device 102, thereby increasing flexibility of the design or installation. This facilitates, for example, coexistence or integration with existing or new devices or equipment. This also allows heat sources to be spatially separated or distributed (in other words, avoids or mitigates concentration of the heat sources), thereby relaxing, for example, a thermal environmental condition required for at least one of STA radio device 101, PCP/AP radio device 102 and control device 103.

Note that the same applies to roadside apparatus 200. For example, STA radio device 201 and control device 203 may be accommodated in a single housing, and PCP/AP radio device 202 and control device 203 may be accommodated in a single housing.

Note that the installation relation between STA radio device 101 and PCP/AP radio device 102 may be reversed in Embodiment 1 described above. For example, PCP/AP radio device 102 may be attached to vehicle 10 toward a direction to emit radio waves to the front of vehicle 10, and STA radio device 101 may be attached to vehicle 10 toward a direction to emit radio waves to the back of vehicle 10.

The same applies to roadside apparatus 200. For example, communication area #2 by PCP/AP radio device 202 may be formed on a side where traveling vehicle 10 moves away from roadside apparatus 200, and communication area #1 by STA radio device 201 may be formed on a side where traveling vehicle 10 approaches roadside apparatus 200.

Further, both STA radio device 101 (201) and PCP/AP radio device 102 (202) may be a radio device supporting both the STA mode and the PCP/AP mode. The operation modes may be switched by control of control device 103 (203). For example, the operation modes of the radio device may be switched between the STA mode and the PCP/AP mode in response to the switching of a forward movement and a backward movement of vehicle 10.

The configuration described above makes it possible to change the operation mode to be connectable depending on the operation mode of the counterpart, thereby increasing the connection success rate. Further, the configuration can also be applied to a moving object whose traveling direction is switched, such as a train, a bullet train, a vessel, and an airplane.

In the embodiment described above, " . . . er (or)" and "section" used for each component may be replaced with other terms such as " ... circuit (circuitry)", " ... device", " ... unit" and " ... module".

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a radio base station backhaul line a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of Present Disclosure

A radio communication apparatus according to an embodiment of the present disclosure includes: a first radio device, which in operation, scans a first signal for detecting a connection destination on one of a front side or a back side of a moving object, the first signal for detecting the connection destination being a signal for first moving object-to-moving object communication or first roadside apparatus-to-moving object communication; and a second radio device, which in operation, transmits a second signal for detecting a connection destination toward the other of the front side or the back side of the moving object, the second signal for detecting the connection destination being a signal for second moving object-to-moving object communication or second roadside apparatus-to-moving object communication.

In the radio communication apparatus according to an embodiment of the present disclosure, the first radio device and the second radio device may be integrally installed on the moving object.

In the radio communication apparatus according to an embodiment of the present disclosure, the first radio device and the second radio device may be installed on a roof of the moving object.

In the radio communication apparatus according to an embodiment of the present disclosure, the first radio device and the second radio device may be separately installed on a front section and a rear section of the moving object.

In the radio communication apparatus according to an embodiment of the present disclosure, the front section may be at least one of a dashboard, a sun visor, a front monitoring camera, a rearview mirror, and/or a front bumper, and the rear section may be at least one of a shark fin antenna, a rear monitoring camera, a back door, and/or a rear bumper.

The radio communication apparatus according to an embodiment of the present disclosure may include a control device, which in operation, controls data transmission between the first radio device and the second radio device.

In the radio communication apparatus according to an embodiment of the present disclosure, the first moving object-to-moving object communication or the second moving object-to-moving object communication may be communication related to at least one of a service on driving safety support systems, a sensor data sharing service, and/or a distribution service of an image and/or a video by a dashboard camera and a camera mounted on the moving object.

In the radio communication apparatus according to an embodiment of the present disclosure, the first roadside apparatus-to-moving object communication or the second roadside apparatus-to-moving object communication may be communication related to at least one of an Internet connection service, an automatic toll payment service using electric toll collection (ETC), a service on driving safety support systems, a sensor data sharing service, a software and/or firmware update service, a map distribution service, a distribution service of an image and/or a video by a surveillance camera and a camera mounted on a roadside apparatus, and/or a traffic information distribution service.

In the radio communication apparatus according to an embodiment of the present disclosure, the data transmission may be a relay of data in an image and/or video transmission service.

A roadside apparatus according to an embodiment of the present disclosure includes: a first radio device, which in operation, scans a first signal for detecting a connection destination on one of a side where a moving object approaches the roadside apparatus or a side where the moving object moves away from the roadside apparatus, the first signal for detecting the connection destination being a signal for first roadside apparatus-to-moving object communication; and a second radio device, which in operation, transmits a second signal for detecting a connection destination toward the other of the side where the moving object approaches the roadside apparatus or the side where the moving object moves away from the roadside apparatus, the second signal for detecting the connection destination being a signal for second roadside apparatus-to-moving object communication.

In the roadside apparatus according to an embodiment of the present disclosure, the first radio device and the second radio device may be installed in a single housing.

In the roadside apparatus according to an embodiment of the present disclosure, the first radio device and the second radio device may be respectively installed in two housings that are separated on the side where the moving object approaches the roadside apparatus and the side where the moving object moves away from the roadside apparatus.

The roadside apparatus according to an embodiment of the present disclosure may include a control device, which in operation, controls signal transmission between the first radio device and the second radio device.

A radio communication method for a moving object according to an embodiment of the present disclosure includes: scanning, by a first radio device of the moving object, a first signal for detecting a connection destination on one of a front side or a back side of the moving object, the first signal for detecting the connection destination being a signal for first moving object-to-moving object communication or first roadside apparatus-to-moving object communication; and transmitting, by a second radio device of the moving object, a second signal for detecting a connection destination toward the other of the front side or the back side of the moving object, the second signal for detecting the connection destination being a signal for second moving object-to-moving object communication or second roadside apparatus-to-moving object communication.

A radio communication method for a roadside apparatus according to an embodiment of the present disclosure includes: scanning, by a first radio device of the roadside apparatus, a first signal for detecting a connection destination on one of a side where a moving object approaches the roadside apparatus or a side where the moving object moves away from the roadside apparatus, the first signal for detecting the connection destination being a signal for first roadside apparatus-to-moving object communication; and transmitting, by a second radio device of the roadside apparatus, a second signal for detecting a connection destination toward the other of the side where the moving object approaches the roadside apparatus or the side where the moving object moves away from the roadside apparatus, the second signal for detecting the connection destination being a signal for second roadside apparatus-to-moving object communication.

The disclosure of Japanese Patent Application No. 2019-061481, filed on Mar. 27, 2019, including the specifications, drawings and abstracts, is incorporated herein by reference in its entirety.

INDUSTRIAL APPLICABILITY

The present disclosure is suitable for radio communication between moving objects or between a roadside apparatus and a moving object.

REFERENCE SIGNS LIST 10, 10A, 10B, 10C Vehicle
100, 100a, 100b, 100c In-vehicle apparatus
101 STA radio device
102 PCP/AP radio device
103 Control device
111 Sensor
112 CPU
113 Memory
200 Roadside apparatus
201 STA radio device
202 PCP/AP radio device
203 Control device
210 Communication device
211 Sensor
212 CPU
213 Memory

The invention claimed is:

1. A radio communication apparatus, comprising:
a first radio device, which in operation, scans a first signal used in detecting a connection destination on a front side of a first moving object, the first signal being used in detecting the connection destination in first moving object-to-moving object communication or first roadside apparatus-to-moving object communication; and
a second radio device, which in operation,
transmits a second signal used in detecting a connection destination of a second moving object toward a back side of the first moving object, the second signal being used in detecting the connection destination in second moving object-to-moving object communication;
establishes the second moving object-to-moving object communication with the second moving object;
transmits, using the second moving object-to-moving object communication, a list of services that the radio communication apparatus is capable of relaying, from the first moving object-to-moving object communication or the first roadside apparatus-to-moving object communication, to the second moving object;
receives, from the second moving object, a request for provisioning a service of the list of services; and
provisions the service to the second moving object over the second moving object-to-moving object communication.

2. The radio communication apparatus according to claim 1, wherein,
the first radio device operates in a station (STA) mode, and
the second radio device operates in a PBSS Central Point (PCP) mode or an access point (AP) mode.

3. The radio communication apparatus according to claim 1, wherein the first radio device and the second radio device are integrally installed on the first moving object.

4. The radio communication apparatus according to claim 3, wherein the first radio device and the second radio device are installed on a roof of the first moving object.

5. The radio communication apparatus according to claim 1, wherein,
the first radio device is installed on a front section of the first moving object, and
the second radio device is installed on a rear section of the first moving object.

6. The radio communication apparatus according to claim 5, wherein,
the front section is at least one of a dashboard, a sun visor, a front monitoring camera, a rearview mirror, and/or a front bumper, and
the rear section is at least one of a shark fin antenna, a rear monitoring camera, a back door, and/or a rear bumper.

7. The radio communication apparatus according to claim 1, comprising a control device, which in operation, controls data transmission between the first radio device and the second radio device.

8. The radio communication apparatus according to claim 1, wherein the first moving object-to-moving object communication or the second moving object-to-moving object communication is communication related to at least one of a service on driving safety support systems, a sensor data sharing service, and/or a distribution service of an image and/or a video by a dashboard camera and a camera mounted on the first moving object.

9. The radio communication apparatus according to claim 1, wherein the first roadside apparatus-to-moving object communication or the second roadside apparatus-to-moving object communication is communication related to at least one of an Internet connection service, an automatic toll payment service using electric toll collection (ETC), a service on driving safety support systems, a sensor data sharing service, a software and/or firmware update service, a map distribution service, a distribution service of an image and/or a video by a surveillance camera and a camera mounted on a roadside apparatus, and/or a traffic information distribution service.

10. The radio communication apparatus according to claim 7, wherein the data transmission is a relay of data in an image and/or video transmission service.

11. A roadside apparatus, comprising:
a first radio device, which in operation, scans a first signal used in detecting a connection destination on a first direction where a first moving object moves away from the roadside apparatus, the first signal being used in detecting the connection destination in first roadside apparatus-to-moving object communication; and
a second radio device, which in operation,
transmits a second signal used in detecting a connection destination of a second moving object toward a second direction where the second moving object approaches the roadside apparatus, the second signal being used in detecting the connection destination in second roadside apparatus-to-moving object communication;
establishes the second roadside apparatus-to-moving object communication with the second moving object;
transmits, using the second moving object-to-moving object communication, a list of services that the roadside apparatus is capable of relaying, from the first roadside apparatus-to-moving object communication, to the second moving object;
receives, from the second moving object, a request for provisioning a service of the list of services; and
provisions the service to the second moving object over the second roadside apparatus-to-moving object communication.

12. The roadside apparatus according to claim 11, wherein the first radio device and the second radio device are installed in a single housing.

13. The roadside apparatus according to claim 11, wherein,
the first radio device and the second radio device are respectively installed in two separate housings, and
the first radio device is installed on the first side where the first moving object moves away from the roadside apparatus, and the second radio device is installed on the second side where the second moving object approaches the roadside apparatus.

14. The roadside apparatus according to claim 11, comprising a control device, which in operation, controls signal transmission between the first radio device and the second radio device.

15. A radio communication method for a first moving object, the radio communication method comprising:
scanning, by a first radio device of the first moving object, a first signal used in detecting a connection destination on a front side of the first moving object, the first signal being used in detecting the connection destination in first moving object-to-moving object communication or first roadside apparatus-to-moving object communication;
transmitting, by a second radio device of the first moving object, a second signal used in detecting a connection destination of a second moving object toward a back side of the first moving object, the second signal being used in detecting the connection destination in second moving object-to-moving object communication;
establishing, by the second radio device, the second moving object-to-moving object communication with the second moving object;
transmitting, by the second radio device and using the second moving object-to-moving object communication, a list of services that the first moving object is capable of relaying, from the first moving object-to-moving object communication or the first roadside apparatus-to-moving object communication, to the second moving object;
receiving, by the second radio device from the second moving object, a request for provisioning a service of the list of services; and
provisioning, by the second radio device, the service to the second moving object over the second moving object-to-moving object communication.

16. A radio communication method for a roadside apparatus, the radio communication method comprising:
scanning, by a first radio device of the roadside apparatus, a first signal used in detecting a connection destination on a first direction where a first moving object moves away from the roadside apparatus, the first signal being used in detecting the connection destination in first roadside apparatus-to-moving object communication;
transmitting, by a second radio device of the roadside apparatus, a second signal used in detecting a connection destination of a second moving object toward a second direction where the second moving object approaches the roadside apparatus, the second signal being used in detecting the connection destination in second roadside apparatus-to-moving object communication;

establishing, by the second radio device, the second roadside apparatus-to-moving object communication with the second moving object;

transmitting, by the second radio device and using the second moving object-to-moving object communication, a list of services that the roadside apparatus is capable of relaying, from the first roadside apparatus-to-moving object communication, to the second moving object;

receiving, by the second radio device from the second moving object, a request for provisioning a service of the list of services; and provisioning, by the second radio device, the service to the second moving object over the second roadside apparatus-to-moving object communication.

* * * * *